United States Patent

[11] 3,582,556

[72] Inventor Saul B. Dinman
Wayland, Mass.
[21] Appl. No. 806,884
[22] Filed Mar. 13, 1969
[45] Patented June 1, 1971
[73] Assignee G. R. Industries, Inc.
Newton, Mass.

[54] LOW-CURRENT-DRAIN REMOTE MULTIPLE-ALARM SYSTEM WITH PRIORITY-ALLOCATION CAPABILITY
13 Claims, 11 Drawing Figs.

[52] U.S. Cl. .......... 179/5
[51] Int. Cl. .......... H04m 11/04
[50] Field of Search .......... 179/5 P, 5, 2 R

[56] References Cited
UNITED STATES PATENTS

| | | | |
|---|---|---|---|
| 3,098,214 | 7/1963 | Windes et al. | 179/15(A) |
| 3,188,392 | 6/1965 | Ferrell | 179/5 |
| 3,347,987 | 10/1967 | Chaloupka | 179/2(R) |

FOREIGN PATENTS

| | | | |
|---|---|---|---|
| 997,744 | 7/1965 | Great Britain | 179/5(P) |

OTHER REFERENCES

GE Transistor Manual, copyright 1964 by General Electric Co., 7th Edition, p. 103 Figures 4.8 and 4.9 (copy available in Scientific Library)

*Primary Examiner*—William C. Cooper
*Assistant Examiner*—David L. Stewart
*Attorney*—Rosen and Steinhilper

ABSTRACT: The disclosure describes a system composed of four channels of alarm-sensing electronic circuits, a four-track tape loop having four separate verbal messages recorded on it, in combination with a communications line hookup, for receiving an alarm signal in any channel and transmitting over lines a recorded message characteristic of the received alarm. The electronic circuits allot among themselves priority of simultaneously received alarm signals according to a selected scheme, and on a first-come, first-served basis if not received simultaneously.

INVENTOR
SAUL B. DINMAN
BY ROSEN & STEINHILPER
ATTORNEYS

INVENTOR
SAUL B. DINMAN
BY
ROSEN & STEINHILPER
ATTORNEYS

INVENTOR
SAUL B. DINMAN

BY ROSEN & STEINHILPER

ATTORNEYS

INVENTOR
SAUL B. DINMAN
BY ROSEN & STEINHILPER
ATTORNEYS

SEQUENCE OF OPERATIONS
SWITCHING FROM A1 TO A2

INVENTOR
SAUL B. DINMAN
BY ROSEN & STEINHILPER
ATTORNEYS

LOW-CURRENT-DRAIN REMOTE MULTIPLE-ALARM SYSTEM WITH PRIORITY-ALLOCATION CAPABILITY

BACKGROUND OF THE INVENTION

The utility of apparatus for detecting fire or forcible entry in a building, or failure of equipment such as a heating or refrigerating system, and signalling the event automatically via the available telephone system to a remote location has long been recognized. A dual-alarm system is described in U.S. Pat. No. 3,287,500 of J. E. Moore, Jr. This system relies on mechanical relays for channel selection and switching, and is limited in flexibility and channel capacity. Moreover, the pulsing preamplifier and driver circuits of this patent are normally electrically conductive in the quiescent state while watchfully waiting for an alarm signal, thereby consuming electrical energy in the standby condition and effectively precluding battery operation. A somewhat different system, affording only one alarm channel and requiring operating power from the telephone system is shown in Glidden's U.S. Pat. No. 3,390,234. If only for the reason that the telephone system is not a suitable source of power, that scheme is not practical.

DESCRIPTION OF THE INVENTION

Systems according to the present invention draw minimum current in the standby condition, which is only the unavoidable, very low leakage current which flows through available silicon switching transistors in the "off" condition. The use of relays is avoided except where absolutely necessary—as required to mechanically disconnect and electrically isolate the system from telephone lines when not in use to transmit an alarm message. Solid-state circuitry is employed requiring extremely small current when in standby-condition and not in use to process an alarm signal, typically, less than 50 microamperes (0.00005 amperes) in a four-channel system. Such a system can be maintained continuously in a standby-condition for two years by a set of eight manganese alkaline C-cells (e.g.: "Eveready" Type E-93). The same power supply will last approximately 1 year if the system is operated to process alarms through 36 consecutive operations, for in normal alarm-processing operation, the system requires (as an example) 12 volts DC at a normal current of 0.3 amps (300 milliamperes).

The invention employs a separate channel of solid-state alarm detecting and logic circuits for each category of alarms—e.g.: fire, intrusion, equipment failure (heating plant, refrigerating plant, etc.), or other category which may be of interest. More than two categories of alarms can easily be detected and processed, and a separate verbal message can be transmitted to a unique monitoring substation or to a unique group of substations, for each category. An alarm or event-detecting circuit is coupled to the detecting circuit of each channel network, and functions to switch that detecting circuit from its "off" standby state to the "on" state, and this event switches the logic circuits "on," to activate them. Switching on the logic circuits in any channel also switches on power to the message handling circuits and components and to the line-connecting relay, which are normally without power in the standby condition. In this manner a multichannel system according to the invention can be made to draw small currents as mentioned above while in a standby condition of continuous watch over a plurality of potential events.

The message handling components include, as a presently preferred example, a magnetic tape having a plurality of tracks equal to the number of alarm channels of the system, and a read head for each track. The logic circuits of each channel, when activated, switch the appropriate head to the input of the message handling circuits (audio amplifier for verbal message and tone detector for signalling (e.g.: dialing) the appropriate monitoring station or stations) for (as an example) sending a message corresponding to the detected event to a party or parties intended to be advised of that event. The logic circuits also provide appropriate inhibit signals among themselves, for the control of priorities and traffic as will be described in detail below.

It will be appreciated that the invention is useful to supervise events in various situations where direct and reliable monitoring of a number of independent events that can occur simultaneously is required, as in a chemical processing plant or other production facility, or for environmental testing and supervision in general, in which cases internal communications lines may be used in lieu of telephone lines, and the monitoring stations may be gathered in one location under the supervision of one person. An embodiment of the invention is now described as intended for use with public service telephone lines, and it will be understood that this is by way of example only. This description refers to the accompanying drawings, in which:

Figure 1:
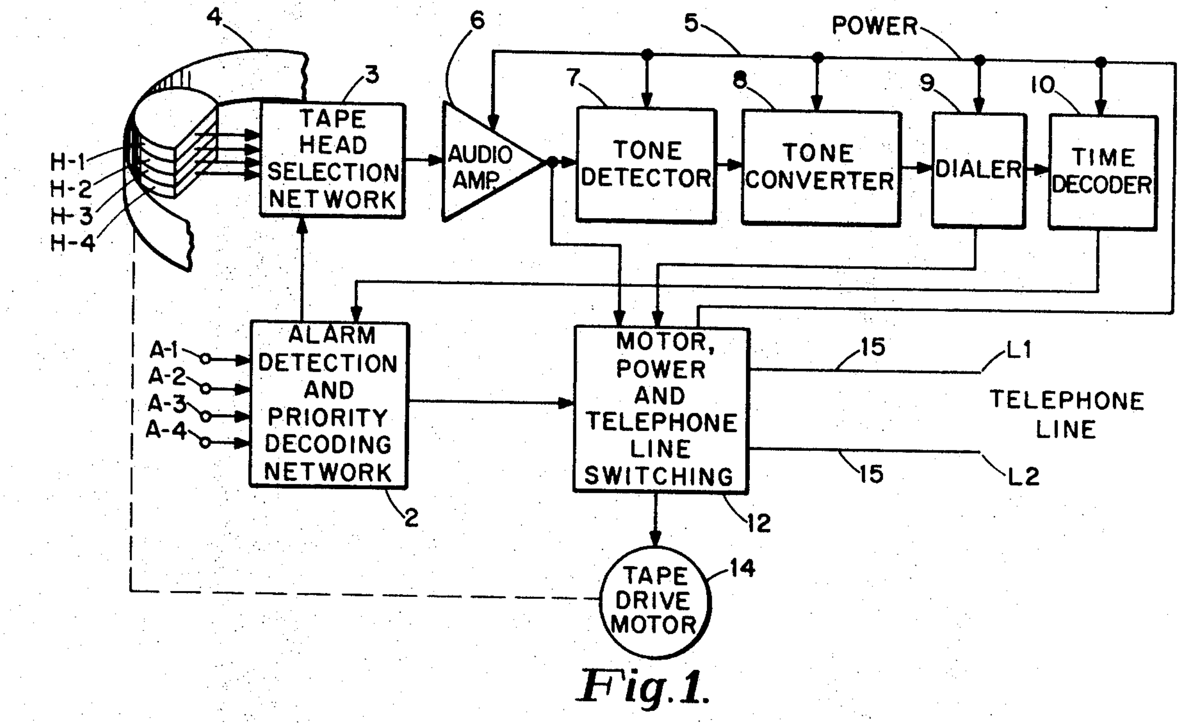
FIG. 1 is a block diagram illustrating the general layout of a four-channel alarm system.

FIG. 1 is a block diagram of one form of the alarm system which transmits a telephone message from any one of four alarm sources. The alarm sources, A–1, A–2, A–3 and A–4, may represent unique categories respectively; for example, police alarms (A–1), fire alarms (A–2), internal alarms (A–3) such as machinery failures in a factory or warehouse, and miscellaneous alarms such as a power failure (A–4), of interest to a party using the system. Each category may include switch devices wired in series-parallel combinations as a function of whether they are normally open or normally closed devices; thus, as is well-known, normally open alarm switches are wired in parallel with each other, while normally closed switches are wired in series with other alarm switch devices. The ultimate goal of such grouping is to present a single pair of wires as the output terminals of each of the alarm sources A–1 to A–4, respectively, whose net effect is to present a prescribed voltage appearing on one wire of the pair. This pair of wires is then connected to the selected alarm category terminals of the system. A scheme for doing this is described below with reference to FIG. 8 of the accompanying drawings.

Upon receipt of an alarm signal at one of the input terminals, A–1 to A–4 respectively, the alarm detection and priority decoding network 2 provides a signal for the tape head selection network 3, which in turn selects one of the four tape heads, H–1, H–2, H–3 and H–4, and connects it to the a audio amplifier 6. The tape 4 is an endless loop of magnetic tape to be described in connection with FIG. 2 on which prescribed messages are recorded in a four-track stereo format to be described in connection with FIG. 3, and there is one head for each track. The priority decoding portion of the network 2 (to be described in detail in connection with FIG. 6), serves several functions; it assures that an alarm signal being processed is not interrupted by occurrence of an alarm signal in another category; that such other alarm signal is processed when processing of the preceding alarm signal is completed; that a prescribed priority is assigned among alarms in different categories occuring simultaneously; and it makes sure that alarms in all categories are eventually acted upon even if they occur simultaneously. The network 2 also provides a signal for the power, motor and telephone line switching network 12, which switches power to line 5, starts the tape drive motor 14, and connects the output of the audio amplifier 6 into the telephone line 15. The telephone line 15 is thus closed to the system in the same manner that the line is closed to a telephone instrument by lifting the handset of the instrument from its cradle. After a predetermined time interval has elapsed, as provided by a gap 25 on the tape 4 (FIG. 3), the telephone circuit to the dialing equipment in the central exchange (not shown) will normally have been established. The dialing codes 26 follow the gap 25 on the tape, and are (in the present example) in the form of a train of pulses of 5 kHz. tone for each digit of the 'phone number. The number 6 is, for example, represented by a train of 6 pulses of the 5 kHz. tone. The dialing signals are read from the tape 4, through the audio amplifier 6 by way of the head H-1 to H-4, inclusive, selected by the head selection network 3. Part of the amplified signal drives a tone detector 7 which in turn drives a tone converter 8. The tone detector passes only the 5 kHz. audio tones to the tone converter. The tone converter converts each pulse of 5kHz. audio frequency signal into a steady-state voltage pulse which is used to drive the dialer 9. The voltage pulses from the converter also drive the time decoder 10. The dialer 9 is simply a normally closed relay having its contacts in series with one of the telephone lines 15. For each tone-coded pulse recorded on the tape 4, the dialer switch contacts are opened, and then closed. The act of intermittently opening and closing the telephone line accomplishes the dialing function. The recorded trains of number pulses are similar to the trains of pulses generated by a conventional telephone dial, and in practice are conveniently generated by a telephone dial for recording on the tape. In a tone-dialing system there is no need to use the dialer unit 9 for station calling, since tone dialing is accomplished by the transmission over the telephone lines of signals which are frequency-coded in the audio range, and which are recorded on the tape 4 in place of trains of pulses of a single frequency. The time decoder 10 is useful, in either case, to determine when a message is completed, as will presently be explained.

When dialing has been completed, there is another pause due to a gap 27 on the tape. This pause provides a time interval for the called party to answer his 'phone before the message following in space 28 on the tape is transmitted. The verbal message 28 which follows the gap 27 is transmitted from the selected tape head to the audio amplifier 6, and then out over the 'phone line 15 via the line switching network 12. Audiofrequencies in the human voice are not sufficiently high to affect the tone detector 7. The dialer 9 therefore remains inactive during the verbal message transmission. At the end of the verbal message there is a burst of 5 kHz. audiofrequency in space 29, lasting at least 5 seconds, which passes the tone detector 7 and tone converter 8, and causes the dialer 9 contacts to open for the duration of the burst. This is an end-of-message signal. It is routed also to the time decoder 10, which responds only to a signal which lasts about 10 seconds. Two types of end-of-message signals are used. One is of comparatively short duration (about 5 seconds) and the other is much longer (about 15 seconds). Each of these signals will activate the dialer 9, causing the 'phone line connection to be broken long enough to accomplish a hang-up operation, but only the latter is sufficiently long (i.e.: greater than 10 seconds) to pass through the time decoder 10. In the case of the shorter signal, the system remains in operation when this end-of-message signal is over, and the 'phone lines 15 will be reconnected to the system; the motor 14 will still be running and another message following in section 30 on tape 4 may be sent to another party about the same alarm. This is a useful feature, and permits the system to notify, in sequence, the proper authority (e.g.: the police) as well as, say, the proprietor or subscriber, of an alarm. The longer signal (i.e. longer than 10 seconds), which activates the time decoder 10, will occur in a section 29 or similar at the end of the last message to be sent in response to an alarm signal in any given category, and causes the system to disconnect itself from the 'phone lines 15 and shuts off power to the tape motor 14, provided, of course, that there are no further alarms to be transmitted. The tape 4, when it stops, will have the heads H-1 to H-4 approximately adjacent a position, represented by dashed index line 290 across the tape, located about 10 seconds into this end-of-message signal, with about 5 seconds remaining, and immediately preceding the gap 25, ready for another alarm.

Figure 2A:
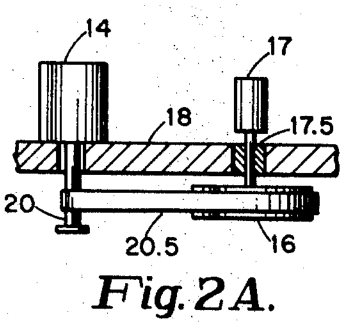
FIGS. 2, 2A and 2B are schematic views of a four-track tape deck useful in the system of FIG. 1.
Figure 2:
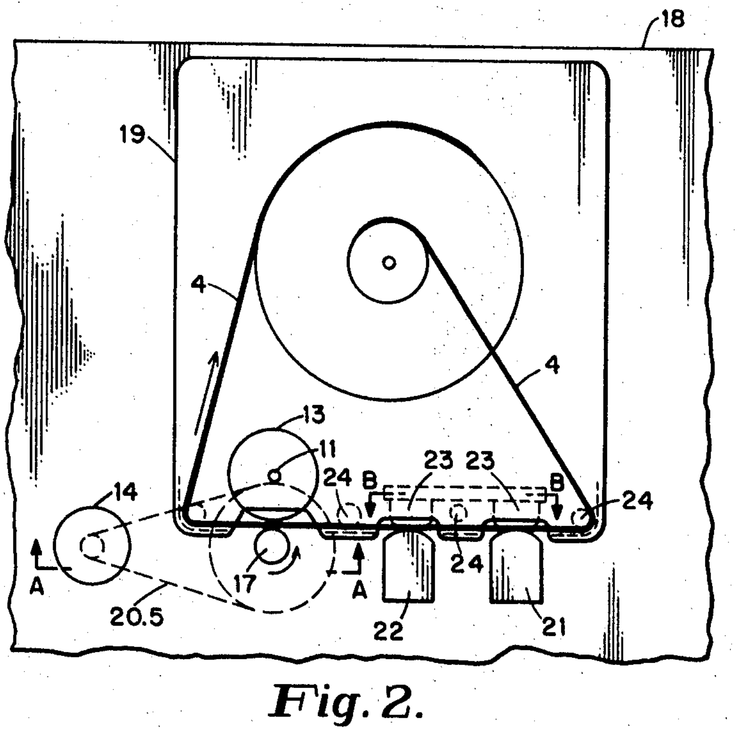
Figure 2B:
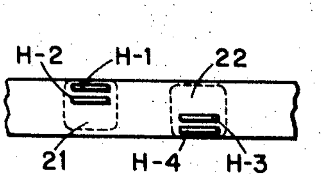
Figure 3:
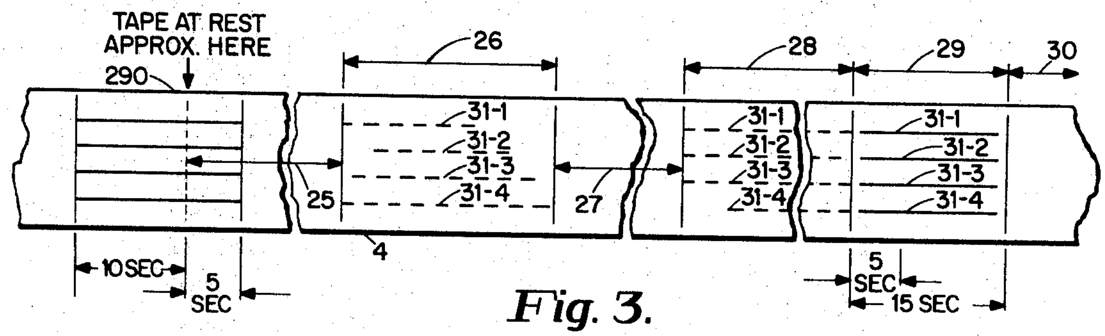
FIG. 3 illustrates the message format on a four-track magnetic tape for use in a four-channel system such as that of FIG. 1.

FIGS. 2 and 2A are, respectively, a top view and a partial sectional view of a typical presently preferred form of tape unit. This unit includes a cartridge 19 located on a supporting platform 18 and containing an endless loop of the tape 4, the motor 14 and two conventional stereo tape playback head assemblies 21 and 22. The motor is mounted on the supporting platform 18 and its drive spindle 20 projects through the platform, to engage the flywheel 16 of a capstan 17 via a belt 20.5. The capstan is supported on the platform 18 in a bearing 17.5. As illustrated in FIG. 2B, tape head assembly 21, containing heads H-1 and H-2, is positioned to locate these heads opposite the first two tracks 31-1 and 31-2, respectively, on the tape 4, (shown in FIG. 3) and tape head assembly 22 containing heads H-3 and H-4 is positioned to locate these heads opposite the remaining two tracks 31-3 and 31-4, respectively. FIG. 2 schematically shows a typical arrangement of pressure pads 23 which holds the tape 4 in close contact with the head assemblies 21 and 22 when the tape cartridge is installed. Tape guides 24 keep the tape positioned properly over the heads. A pinch roller 13 is supported on a spindle 11 in the housing of the cartridge 19 holds the tape 4 against the capstan 17 for driving the tape past the heads.

Referring again to FIG. 3, as is mentioned above, the tape is at rest with the heads H-1 to H-4, inclusive, approximately at index line 290 when an incoming alarm signal activates the system. Immediately following activation of the system responsive to an incoming alarm signal, power is switched to power line 5 and to the motor 14, and the amplifier 6 is connected to the telephone lines 15. Due to inertia, there is a delay of approximately 1 or 2 seconds before the tape 4 achieves the speed required to dial or to send a message. In this interval a signal changing in frequency from 0 to 5 kHz. is presented to the amplifier 6 from the approximate 5 seconds remaining of the end-of-message signal following index 290. Following this interval approximately 3 to 4 seconds of 5 kHz. end-of-message signal still remaining adjacent the beginning of interval 25 occur, and this activates the dialer 9 to open the telephone line for 3 to 4 seconds, which disconnects the system from the lines 15 for an interval that is not long enough to shut down the equipment. Immediately following this 3 to 4 second disconnection, interval 25 is reached, and dialer 9 reconnects the system to the line. The interval 25 is long enough to allow time for the 'phone lines 15 to be connected to the telephone exchange.

The sequence of start-up events described above causes the dialer 9 to break the connection to the 'phone lines 15 for a few seconds after it has been made upon activation of the system and before it is again made in the time interval corresponding to the gap 25. This sequence of connect-disconnect-reconnect events accomplishes a function which is known as "line seizure" in the telephone industry, which is effective when the central exchange to which the 'phone lines 15 run employs a solid-state switching systems. This technique of line seizure, which is accomplished with a telephone instrument simply by hanging up and then picking up the receiver again, is used to prevent jamming of the telephone line by means of an incoming call. Line jamming in this manner is sometimes used by would-be burglars to disable alarm systems connected to telephone lines on premises intended to be entered. The system of the present invention employs the technique of line seizure, when available from the public telephone facilities, to foil such line jamming and is believed to be unique in this respect.

Four different telephone numbers are shown recorded in segment 26 on the tape, one for each channel 31-1, 31-2, 31-3 and 31-4, respectively. The pulses of high frequency (5 kHz. dialing signal are represented as a series of dashed lines in each channel. The next gap 27 is provided to allow time for the called party to answer his telephone. The verbal message follows in segment 28. Following each message is the "hang-up" or "disconnect" signal in segment 29. If only one party is to be informed of the alarm, this is a disconnect pulse (greater than 10 seconds), and the system will then be shut down, and the tape motor 15 and tape 4 will coast to a stop with the heads somewhere in the end-of-message segment 29, typically within one second following the 10-second shut down point. Wherever the tape 4 stops adjacent a head will be the index 290, and the system will then be prepared to transmit a new alarm. If, however, a disconnect signal is not recorded in segment 29, but a hang-up signal (less than 10 seconds long) appears instead, a new 'phone number and message follows in the same channel and in the same format as previously described. Any number of parties may be informed in sequence of a given alarm by simply recording hang-up signals (shorter than 10 seconds) at the end of each of the messages in the same channel until the last party to be informed has been called. The last message in such a sequence is then followed by a disconnect signal (greater than 10 seconds). The length of tape 4 in the cartridge 19 will be determined by the largest number of messages, or parties to be informed, in any of the channels of the system, so that the disconnect signals for all channels are at the same location in the tape, and the index 290 is in the same location (within a few seconds) for all channels, the head assemblies 21 and 22 being spaced apart less then one second relative to the speed of the tape.

DESCRIPTION OF LOGIC OPERATION

Figure 4:
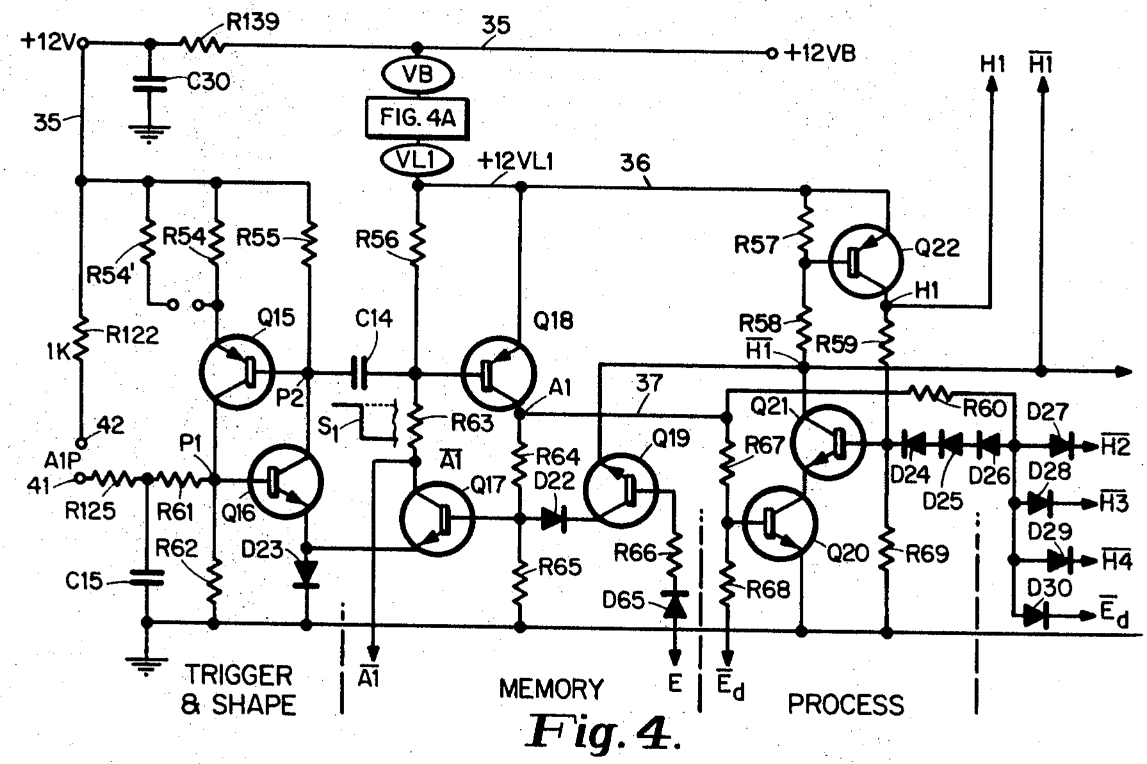
FIG. 4 is a schematic diagram of the alarm-detection and logic circuits for one channel of the system.
Figure 4A:
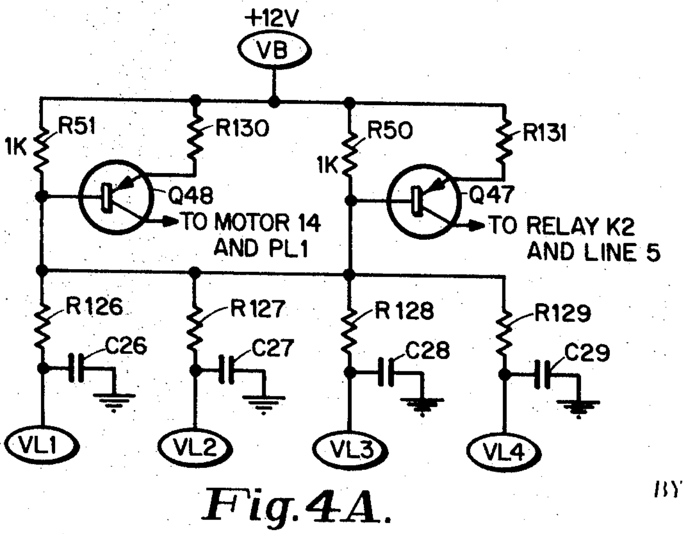
FIG. 4A is a power switching network.

The logic operation of the illustrated system is described in connection with FIGS. 4 and 4A. FIG. 4 shows the details of the channel one logic circuits, it being understood that similar logic circuits (not illustrated) are provided for channels two, three and four. Each logic circuit includes an input section to receive an incoming alarm signal, to trigger in response to it and to provide an output signal S1 of a desired shape, a memory section of remember the alarm signal, and an output section to process the alarm signal. Energizing power is provided to the trigger and shape section over a main power bus 35, marked "+12VB" in FIG. 4. The memory and output sections of each channel's logic circuits receive power over separate logic power buses, illustrated in FIG. 4 as bus 36, marked "+12VL1". In channels two, three and four the corresponding buses are +12VL2, +12VL3 and +12VL4, respectively. Power to these logic power buses is provided from the main power bus 35 through terminal VB to FIG. 4A and then to all the logic power buses in parallel via terminals VL1, VL2, VL3 and VL4 through two resistors R50 and R51 in parallel and in common to all channels, and individual decoupling networks R126–C26 (channel one, R127–C27 (channel two), R128–C28 (channel three) and R129–C29 (channel four), respectively. Typical resistance values of 1 kilohm are indicated for resistors R50 and R51.

When the system is inactive (i.e.: quiescent or standby) all of its logic circuits, as exemplified by the channel one transistors Q15 through Q22 in FIG. 4, are turned off, but in a standby condition. The power switch transistors Q47 and Q48(in FIG. 4A) are "off," with the result that there is no voltage via Q47 in the power line 5, marked "+12VS" in FIG. 5, and all of the transistors in the amplifier 6 and data decoding circuits 7—10 inclusive, are disabled and the line relay K2 is deenergized, and there is no voltage via Q48, so that the tape drive motor 14, and the pilot light PL1 are also not energized. In this standby condition, then, energizing voltage (e.g.: "plus" 12 volts) appearing on the main power bus 35 is applied to transistors Q15 and 16 in the input section of the channel one logic circuit illustrated in FIG. 4 (and corresponding transistors of the logic circuits for channels two, three and four which are not illustrated) through a common decoupling network consisting of a resistor R139 and a capacitor C30. Energizing voltage is also applied in parallel to all the logic power buses, as described above, through the network shown in FIG. 4A.

The operation of the logic circuits will be described in detail in connection with FIG. 4, for a single alarm signal occuring on channel one. In this description exemplary values of voltages, currents and circuit components are stated to illustrate a working embodiment of the invention, not to limit its scope. Any event serving to connect energizing voltage from the main power bus 35 to the base of transistor Q16 will generate an alarm signal S1. External sensing devices (not shown) connected between the terminals 41 and 42 of the channel one input A1P are used to accomplish this function by effectively closing one terminal on the other ("contact closure." The contact closure between these two terminals applies the energizing voltage from the main power bus 35 through a current limiting resistor R122 to the base of transistor Q16, to constitute the operative alarm signal. Resistor R125 and capacitor C15 form an integrating filter network for noisy contact closures (contact bounce) and external noise that may occur in the external signal lines (not shown) between the remotely located phenomenon sensing device and the input A1P. The trigger circuit formed by the complementary pair of transistors Q15 and Q16 is normally off in the absence of an alarm signal, so that the point P1 at the junction of the base of transistor Q16 and resistors R61 and R62 is at zero (i.e.: "-ground") potential and the point P2 at the junction of resistor R55 and capacitor C14 is at a potential of +12 volts. As the filter capacitor C15 begins to charge, the voltage at the junction P1 begins to rise towards approximately one-fourth of the +12VB potential on the main power bus 35 (this is due to the divider action provided by resistors R122, R125, R61 and R62 between +12VB and ground). As soon as the potential at this junction P1 is high enough to overcome the base emitter drop of transistor Q16 plus the forward drop of diode D23 (approximately 1.3 volts) transistor Q16 will turn on drawing collector current through resistor R55 from the main power bus 35. As soon as there is current flow through resistor R55 the potential at the junction of P2 of R55 and C14 will begin to drop from +12 volts toward ground. When this potential drop through resistor R55 exceeds the base emitter drop of transistor Q15, Q15 will begin to turn on and current will flow from the main power bus 35 through emitter load resistor R54 through transistor Q15 towards ground through resistor R62. The additional current now being supplied from the collector Q15 is available to supplement the base current of Q16 and cause its collector current to increase faster than it would through the base current supplied by the alarm signal alone. This will cause Q16 to turn on harder thus drawing more current supplied through its collector load resistor R55. This action in turn drops the potential on the base of transistor Q15 towards ground even faster causing Q15 to turn on even harder. Thus regeneration occurs and both transistors Q15 and Q16 snap on providing a negative going signal S1 at point P2, the leading edge of which is transmitted through the coupling capacitor C14 to the first stage of channel one logic memory; namely, transistor Q18. This completes the "trigger and shape" functions of the input section.

As long as the alarm signal is present, transistors Q15 and Q16 will be held on and the potential at the junction P2 of resistor R55 and C14 will remain at a potential which is slightly above ground by the collector emitter saturation voltage of transistor Q16 plus the forward drop of diode D23. No further information may be transmitted from the input A1P to the logic memory for channel one until input section transistors Q15 and Q16 have both been turned off and then on again, since, as far as the input section is concerned, it is only the negative going leading edge of S1 which appears at the junction P2 that will have any effect on the following channel one logic memory.

If the alarm signal (i.e.: "effective contact closure") is removed from the input terminals 41 and 42, the filter capacitor C15 will discharge through resistors R61 and R62 and the base emitter path of transistor Q16. The net effect of this will be a decrease of current through resistor R62 which will reduce the voltage appearing at the base of transistor Q16. This will in turn decrease the collector current of Q16 and begin raising the potential at the base of transistor Q15. The resistor R54 in the emitter path of Q15, the resistor R62 in the collector path of Q15, and the resistor R55 in the collector path of Q16 have magnitudes chosen to limit the current which will flow through transistor Q15 and therefore the current available to keep transistor Q16 turned on without an external positive voltage signal being supplied to the A1P input terminal 41. As Q15 turns off, it further helps to turn Q16 off which in turn helps to turn Q15 off even harder and regeneration in the opposite direction occurs until both transistors Q15 and Q16 are turned off. Removal of the alarm signal after the memory section has been "set" by an alarm signal does not effect the memory section.

The negative-going edge of signal S1 is transmitted through the coupling capacitor C14 to the base of transistor Q18, and this is sufficient to start transistor Q18 turning on. In the absence of a signal S1 to transistor Q18 is maintained off; the potential A1 at its collector is ground or nominal "zero," as is the potential at the base of transistor Q17. This, in fact, holds Q17 hard off because its emitter is held at slightly positive with respect to ground voltage caused by the drop across diode D23 (approximately three-quarters volt). With Q17 held off, the potential $\overline{A1}$ at its collector is +12 volts, the potential on channel one logic bus 36, and therefore the potential at the base of Q18 is +12 volts in the quiescent state. As transistor Q18 starts to turn on in response to the negative-going signal S1 being coupled to its base through capacitor C14, the collector current which begins to flow through Q18 begins to raise the potential at the base of transistor Q17, which in turn will start Q17 turning on as soon as the base potential overcomes the base-emitter drop of Q17 plus the voltage drop across diode D23. When this occurs, Q17 begins drawing collector current through resistors R56 and R63 which further reduces (i.e.: alters toward ground, or nominal "zero") the potential at the base of Q17 thus turning Q18 on harder. The power supply line for transistors Q17 and Q18 is the logic bus 36 which is supplied through the two resistors R50 and %51 in parallel from the main power bus 35 (see FIG. 4A). If we neglect for a moment the regenerative action of transistors Q17 and Q18, it is seen that if Q18 turns on fully it will try to draw current from a source at +12 volts. A current of 3 milliamperes, however, supplied through the effective 500 ohms of R50 and R51 in parallel would drop the supply voltage (+12VB ) by about 1½volts at the bases of power switch transistors Q47 and Q48 (FIG. 4A). This is more than sufficient to cause both of the power switch transistors to turn on and current to the logic circuit will now also be supplied through the emitter-base paths of Q47 and Q48. Remembering now that regeneration has occurred and both Q17 and Q18 are trying to turn on simultaneously, this causes the power switch transistors Q47 and Q48 to turn on even faster because of the greater voltage drop below +12VB that will occur at their respective bases. Thus, most of the current to the logic circuit bus 36 is actually supplied through the emitter-base junctions of the power switch transistors Q47 and Q48. Transistors Q17 and Q18 form a bistable circuit in which the values of the resistors R56, R63, R64 and R65 are selected to lock both Q17 and Q18 on until some external action tries to turn one of them off. The output terminals of this bistable circuit, the collector of Q18 (A1) and the collector of Q17 ($\overline{A1}$), have now reversed their previous states (described above) from "ground" to "+12 volts" and from "+12 volts" to "ground," respectively. The flip-flop formed by Q17 and Q18 is now in the "set" state and remembers the occurrence of the alarm signal at the channel one input A1P. The power switch transistors Q47 and Q48 are simultaneously turned "on."

When the power switch Q47 is turned on, the line relay K2 (FIG. 5) is energized, connecting the output of the audio amplifier 6 to the telephone line through transformer T1 secondary 51. The power switch Q47 also applies power to the "+12 VS" line 5, to energize the audio and data decoding circuits (6—10, inclusive), comprised in FIG. 5 of transistors Q1 through Q14, Q50, Q51 and Q52. The power switch Q48 supplies current to the tape drive motor 14 and the pilot light PL1, and the tape 4 in the cartridge 19 is started in motion.

The proper tape-reading head is selected and switched into the input of the amplifier by the setting of the H-1 flip-flop in the output or processing station, comprised of transistors Q20, Q21 and Q22. The potential of the A1 line 37 (collector of Q18) has been changed from ground to +12 volts because Q18 has been turned on hard in response to an alarm signal at input A1P. Q18 will now supply current through resistor R67 to the base of transistor Q20 and through resistor R60 and the diode string D24, D25 and D26 to ground through resistor R69. The latter occurs, however, only if all of the priority-control diodes D27, D28, D29 and D30 are back-biased by the signals $\overline{H2}$, $\overline{H3}$, $\overline{H4}$, and $\overline{Ed}$. These three $\overline{H}$ signals come from the channel two, three and four logic circuits respectively, and if no prior signals are present therein (as explained below with reference to FIG. 6), the output section flip-flops which supply these signals are all turned off and the lines which supply these signals will each be at +12 volts. Similarly, as we will see upon examining the E*d* below, its normal state is +12 volts. We may therefore, assume that these four diodes are back-biased, and that all the current supplied over line 37 from transistor Q18 (A1) through resistor R60 will be supplied to resistor R69. This action will cause the potential at the base of transistor Q21 to rise above ground and Q21 will begin to turn on. Transistor Q20 has already had its base emitter junction forward-biased by the combination of the +12 volt signal A1 and the normally +12 volt signal $\overline{Ed}$ both supplying current through the resistors R67 and R68, respectively, to the base of Q20. As Q21 begins to turn on the potential at its collector (the signal $\overline{H1}$) begins to drop from +12 volts toward ground as current is supplied to the two forward-biased transistors Q20 and Q21 through the collector load comprised of resistors R57 and R58 in series. The potential at the base of Q22 therefore also begins to drop from +12 volts toward ground and transistor Q22 begins to turn on which will begin to move the potential on its collector (the signal H1) from its previous state of "ground" toward +12 volts. The current through transistor Q22 will provide more current to the base of Q21, turning it on harder which in turn will aid the turn-on of transistor Q22. Regeneration again occurs and all three transistors saturate very quickly. Reviewing quickly the state that now exists, the signal H1 is now at +12 volts, and $\overline{H1}$ is now at nominal "ground"; the latter change will have no effect on transistor Q19 in the memory section because the signal E, (as will be explained below) is normally at "ground." Thus Q19 is turned off.

The H1 and $\overline{H1}$ signals are applied to the channel one magnetic tape head switch (shown in FIG. 5) comprised of diodes D1, D2, D3 and D4. It will be recalled that the signals H1 and $\overline{H1}$ were in the absence of an alarm signal at input A1P, at ground and +12 volts respectively, and now in response to an alarm signal, these signals are at +12 volts and nominal ground, respectively. The parallel diode chains formed by D1, D2, D3 and D4 (FIG. 5) are in consequence now forward-biased and therefore the H-1 head switch is "turned on." Examination of the head switch signals for channel two, three and four will show that H2 and its complement $\overline{H2}$, H3 and its complement $\overline{H3}$, and H4 and its complement $\overline{H4}$, are all at ground and +12 volts respectively in the absence of prior alarm signals in their respective logic circuits, and that, therefore, and other three head switches are back biased, that is "-turned off."

DESCRIPTION OF THE MESSAGE AND DATA DECODING CIRCUITS

Summary

Figure 5:
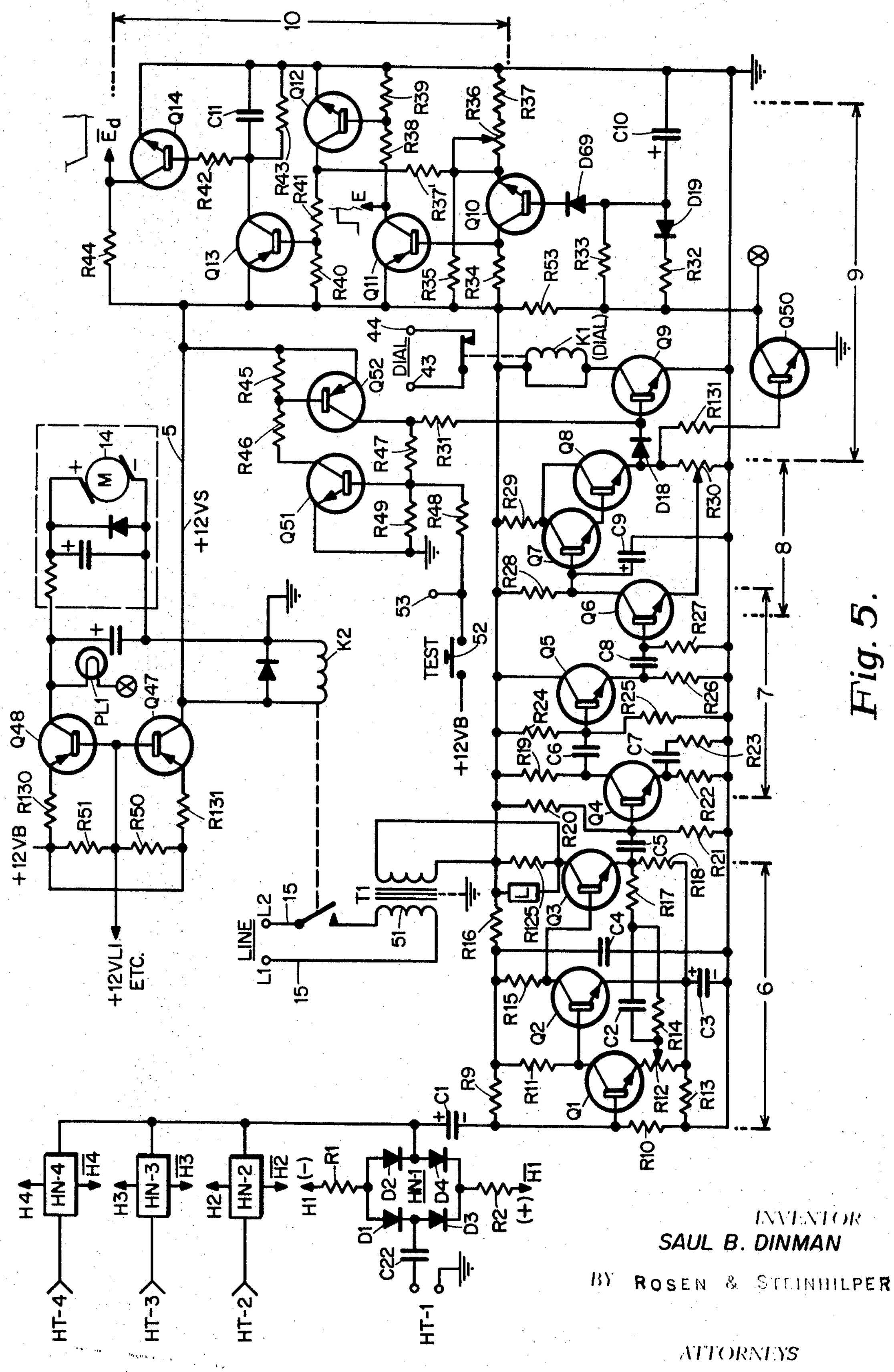
FIG. 5 is a schematic diagram of the message handling and telephone line capture and release circuits of the illustrative system.

Referring to FIG. 5, the tape-reading heads are each electronically switched by a four-diode bridge network, which networks are identical, respectively, labeled HN-1 through HN-4, only one of which HN-1, is illustrated and described in detail. The head switches are followed by the audio amplifier 6 comprised of transistors Q-1, Q-2 and Q-3 driving a telephone line transformer T-1, which matches the usual 600 ohm telephone line impedance. The last stage Q3 of the audio amplifier also drives, from its emitter, the tone detector 7 comprised of transistors Q-4, Q-5 and Q-6. The tone detector separates the 5 Kilo Hertz coding signal from the audio frequency message, rectifies it and drives the dialing relay K-1 in the dialer 9. The tone detector also drives time decoder 10, which includes the integrator comprised of transistors Q-10, Q-11, and Q-12, whose function it is to separate the end-of-message signal from an end-of-tape signal, and transistors Q-13 and Q-14 whose function it is to provide an inverted and delayed end-of-message signal $\overline{Ed}$ for use in the logic circuits (FIG. 4).

Head Switches

The channel one had switch (HN-1) is a four-diode bridge, D1, D2, D3 and D4 which is normally (i.e.: in the absence of an alarm signal that would require use of the first tape reading head) biased "off" by the application of +12 volts to R2 at $\overline{H1}$, and ground (i.e.: relatively) to R1 at H1. This results in all four diodes being back-biased preventing the passage of a signal from the head terminals HT-1 to the base of transistor Q1. The head switch is enabled or "closed" by applying +12 volts to resistor R1 at H1 and grounding resistor R2 at $\overline{H1}$ as is explained in the description of operation of the channel one logic circuit. This allows approximately 60 microamperes of bias current to flow through the diodes. The tape-head signal applied from terminals HT-1 to the junction of diodes D1 and D3 through coupling capacitor C22 causes that junction to follow the signal. Since the diodes are heavily nonlinear, and the signal current is small compared to 60 microamperes, the voltage drops across the respective diodes do not change sufficiently, so that the junction of diodes D2 and D4 changes its potential in the same proportion as the junction of diodes D1 and D3. For example, if a positive-going increment of signal voltage is applied at the junction of diodes D1 and D3 it will cause a decreased current flow through resistor R1 reducing the voltage drop across resistor R1, and therefore raising (toward more positive) the voltage level at the junction of diodes D1 and D2. Likewise, the current flow through resistor R2 is increased, and this raises the voltage drop across resistor R2, the net result being an incremental change toward more positive voltage, of the same magnitude in the voltage level at the junction of diodes D3 and D4. The function of coupling capacitor C22 is to provide a low impedance AC path through the tape-reading head to ground in order to provide filtering of noise that appears on the lines connecting the head switch to the channel one logic circuit.

The invention contemplates the simultaneous supervision of a number (more than two) of events, and makes provision, for example, for four head switches HN-1, HN-2, HN-3 and HN-4, each under control of its own channel logic circuits. Thus head switch HN-2 has terminal means HT-2 for connection to the channel two tape-reading head H-2, and control terminals H2 and $\overline{H2}$ for switching voltage from the channel two logic circuit; head switch HN-3 has terminal means HT-3 for connection to the channel three tape-reading head H-3, and control terminals H3 and $\overline{H3}$ for switching voltage from the channel three logic circuit and head switch HN-4 has terminal means HT-4 for connection to the channel four tape-reading head H-4, and control terminals H4 and $\overline{H4}$ for switching voltage from the channel four logic circuit. The signal outputs of all four switches are connected in parallel to a coupling capacitor C-1 through which the signals recorded in a switch-selected channel on the tape 4 are applied to the audio amplifier.

Audio Amplifier

Capacitor C-1 provides DC isolation between the head switches and the bias network, comprised of resistors R9 and R10, of the first stage of the audio amplifier. Resistors R-9 and R-10 set the DC bias to approximately 2.25 volts. The audio amplifier 6 is a high-grain three-stage DC coupled amplifier with overall AC and DC feedback.

The DC feedback path is from the emitter of transistor Q3 through resistor R18, and the emitter of transistor Q2 through the bias and filter network consisting of resistor R13 and capacitor C3. The AC feedback path is from the emitter of transistor Q3 through resistor R17, and resistor R14 and capacitor C2. Capacitor C2 provides approximately 3 db. deemphasis of the 5 kilohertz coding signal. The potentiometer R12 is a gain adjustment giving an approximate gain range of from 250 to 5000. Transistor Q1 is biased in the microampere region and the collector voltage drop is kept under 1 volt to minimize noise in the first stage. Transistors Q1 and Q2 together provide the major voltage gain with a small amount of gain being added in transistor Q3. Resistor R16 and capacitor C4 serve as a coupling network to reduce the noise on the power bus 5 to the first two stages. The collector load for transistor Q3 is 6,000 ohms, comprised of the terminating resistor R125 (12,000 ohms) for the line transformer T-1 in parallel with the 12,000 ohm impedance seen looking into the primary of T-1. T-1 is a 4.45: 1 voltage ratio transformer giving an impedance ratio of 20:1 (12,000 ohms to 600 ohms) for line matching. Block L represents a diode-limiter bridge useful to prevent dial switching transients, occurring because the dial contacts 43 and 44 are normally in series in the line 15, and which may be amplified in transformer T-1, from affecting the operation of the amplifier 6 and the circuits which follow it. It uses known limiting techniques.

Tone Detector 7, Converter 8 and Dialer 9

From the emitter of transistor Q3 is a signal which includes both the message-audiofrequencies and the 5 kHz. coding signal is fed via a capacitor C5 to the base of transistor Q4 which is the first stage of the tone detector. Capacitor C5 and resistors R21 and R20 provide the first roll off (high pass) for the tone detector and resistors R21 and R20 also serve to provide the DC bias for transistor Q4. The network consisting of resistors R22, R23 and capacitor C7 provides both AC and DC degeneration in the emitter of transistor Q4. Resistor R23 and capacitor C7 give an additional rolloff just below 5 kHz. Resistor 21 is the collector load for transistor Q4 and provides a gain of approximately 4 for the 5 kHz. tone code signal. Capacitor C6 and resistors R24 and R25 provide the second rolloff high pass filter) and capacitor C8 and resistor R27 provide the third rolloff high pass filter). The net result of the stages of transistors Q4 and Q5 with their associated high pass filters gives a better than 18 db. per octave rolloff, resulting in approximately −30db. at 1kc.

Transistor Q6, which is normally biased "off" serves as the coding-signal tone detector and provides threshold sensitivity adjustment through the use of the emitter potentiometer R30. After a coding-signal tone is separated from the audio by the first two stages of the tone detector, it is rectified by transistor Q6, which conducts, discharging capacitor C9 and thereby turning off transistors Q7, Q8 and Q9. These three transistors are normally biased on by resistor R28, since Q6 is normally off, and this results in the dialing relay K1 being normally energized and its associated contact on terminals 43 and 44 being normally closed. When transistor Q6 discharges capacitor C9 and turns off Q7, Q8 and Q9, the dialing relay K1 drops out and its contacts open. Resistor R28 and capacitor C9 have a sufficiently long time constant to smooth the 5 kHz. tone signal. Diode D17 suppresses the coil of relay K1 during switching. The purpose of transistors Q7 and Q8 is to provide sufficient gain and base current to drive (*a*) transistors Q9, which is the driver for the relay K1 and (*b*) transistor Q50, which drives the pilot light PL–1, and (*c*) the time decoder 10. The pilot light PL–1 is connected from the collector power switch transistor 48 to ground via the emitter-collector path of transistor Q50, which is normally conductive, since transistor Q8 is normally on. When dialing signals are present, transistor Q50 is switched off like transistor Q9, and the pilot light PL–1 blinks in accompaniment with the opening and closing of the relay contacts, to indicate that dialing is taking place.

Time Decoder 10

When transistors Q9 and Q50 are in their "normally on" states and relay K1 is energized and pilot light PL–1 is on, Q50 collector is close to "ground" (separated by the base-emitter drop in Q50,) holding transistor Q10 turned off. When a coding-signal tone is detected in Q6, and Q9 and Q50 are turned off, Q50 collector approaches +12 volts, causing capacitor C–10, the integrating capacitor, to be charged through resistors R33 and R53, the integrating resistors, and thereby allowing the junction of capacitor C10, resistor R33 and diode D69 at Q10 base to rise toward +12 volts. The emitter of transistor Q10 is set at a voltage determined by a voltage divider comprising resistor R35 and R37 and potentiometer R36. This emitter voltage determines at what voltage the base of Q10 will be forward-biased; the higher the forward-bias voltage level is, the longer the time it will taken for the integrating capacitor C10 to become charged to that voltage, and therefore, the longer will be the time before transistor Q10 turns on. This time is chosen to be 10 seconds, as is described above. Transistors Q10, Q11, Q12, Q13 and Q14 are all normally off and are all switched on if an end-of-tape signal longer than 10 seconds occurs in tape 4, segment 29, when the voltage across the integrating capacitor C10 exceeds the emitter voltage of transistor Q10 by the sum of the base-emitter drop and the voltage drop across diode D69.

Figure 7:
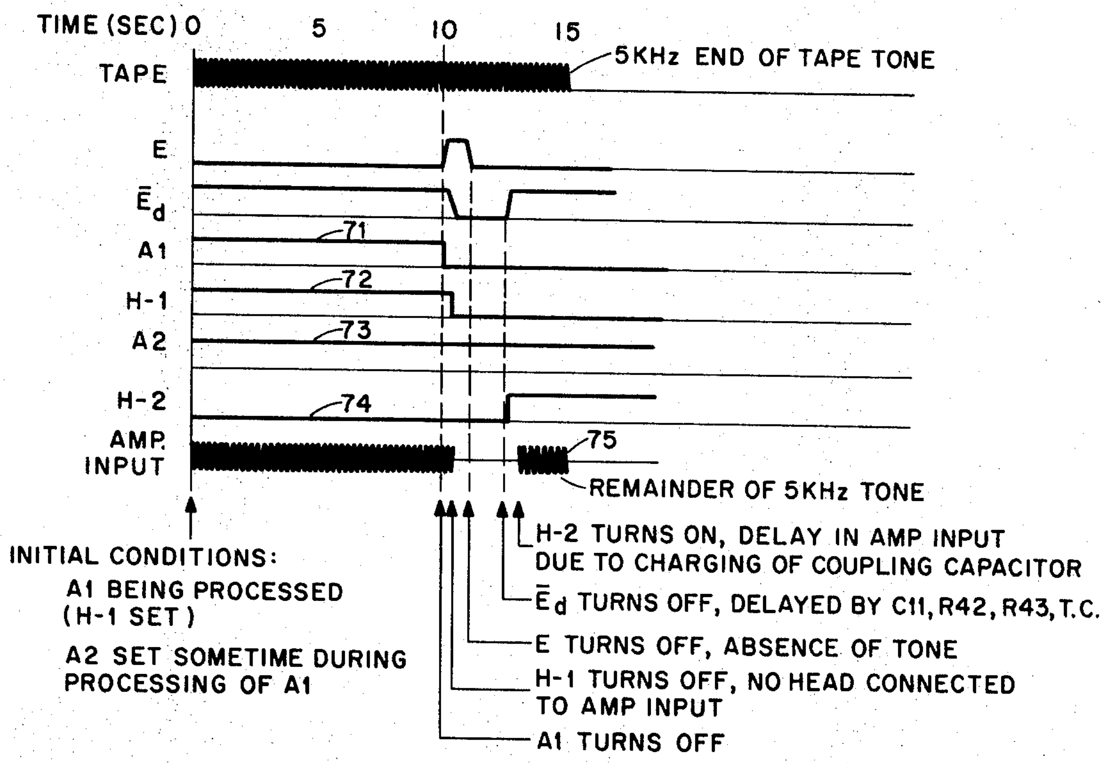
FIG. 7 is a diagram illustrating the sequence of operations involved in switching from one channel to another when messages in two different categories are to be processed.

When transistor Q10 turns on the voltage drop in its collector resistor R34 biases transistor Q11 conductive, providing the positive-going end of tape signal E (illustrated in FIG. 7), and turning on transistor Q12, which causes positive feedback through resistor R35 providing sufficient regeneration in transistor Q10 to cause a rapid change toward +12 volts (end-of-tape signal E) in the collector of transistor Q11. This is done to assure that the rate of change of voltage on Q11 collector will not be two slow on account of the long time constant of the integrating network. At the same time the voltage drop across resistor R40 due to conduction through Q12 collector-emitter path turns on transistor Q13, and the voltage drop across resistor R43 turns on transistor Q14, the collector of which then undergoes a voltage change from +12V to close to nominal "ground," to provide the $\overline{Ed}$ signal. The discharge path of capacitor C11 in series with the parallel combination of resistors R42 and R43 provide a delayed turnoff for transistor Q14. This provides a delayed rising toward +12 volts of the trailing edge on the $\overline{Ed}$ signal, as illustrated in FIG. 7.

In summary then, the signal E which occurs upon decoding of the end-of-tape signal by transistor Q10 will be a positive going signal rising from nominal ground to approach +12 volts, and the signal $\overline{Ed}$ will be a negative going signal going in the opposite sense, from +12 volts toward ground. These signals (the rise of E and the fall of $\overline{Ed}$) occur at approximately the same time, but $\overline{Ed}$ will lag by a small amount due to the presence of capacitor C11. The signal E (positive going) is applied through diode D65 to the base of transistor Q19 in the channel one logic circuits; this will forward bias the base-emitter junction of transistor Q19 if the head selection flip-flop Q21/22 is set, that is if the signal $\overline{H1}$ is at or near ground because transistors Q20 and Q21 are turned on. In this situation transistor Q19 will begin to conduct current away from the base of transistor Q17 through diode D22, transistor Q18 and resistor R64, and the drop in resistor R65 will be correspondingly diminished. This will cause transistor Q17 to begin to turn off, raising the potential at he base of Q18 towards +12. This in turn begins to turn transistor Q18 off and regeneration occurs causing both transistors Q17 and Q18 to turn off, whereby "resetting" the memory section of channel one logic. When transistor Q18 has turned off, transistor Q19 will of course no longer be conducting. Since transistor Q18 is no longer conducting, its collector (the signal A1) is now at ground and transistor Q20 is no longer held on by the previously positive potential applied through R67 to the base of Q20. $\overline{Ed}$ applied to the base of Q20 is now at ground and will no longer provide base current through resistor R68 into Q20 to maintain it in the "on" condition. Transistor 20 therefore turns off, and when this happens the current path for transistor Q21 to ground is broken and the potential at the base of Q22 rises to +12 volts, turning it off. The HN–1 switch potentials H1 and $\overline{H1}$ revert to nominal ground and +12 volts, respectively, disconnecting head H–1 from the amplifier 6. Thus both the memory and output (processing) sections of channel one logic have been shut off and current is no longer flowing through their flip-flop circuits from the +12VL1 line 36. This, in turn, causes the power switching transistors Q48 and Q47 to turn off, shutting down the motor 14 and the pilot light PL–1, disconnecting the line relay K2, and removing power from line 5 to circuits 6—10, inclusive, provided the memory in none of the other channels is "set" and waiting to process an alarm signal received therein. If such is the case, the tape stops with index 290 adjacent the head assemblies 21 and 22 (approximately). If, on the other hand, the memory of another channel is in the "set" condition, the power switching transistors Q47 and Q48 remain turned on, and the signal waiting in the next channel in order of priority is processed, as will now be described.

Figure 6:
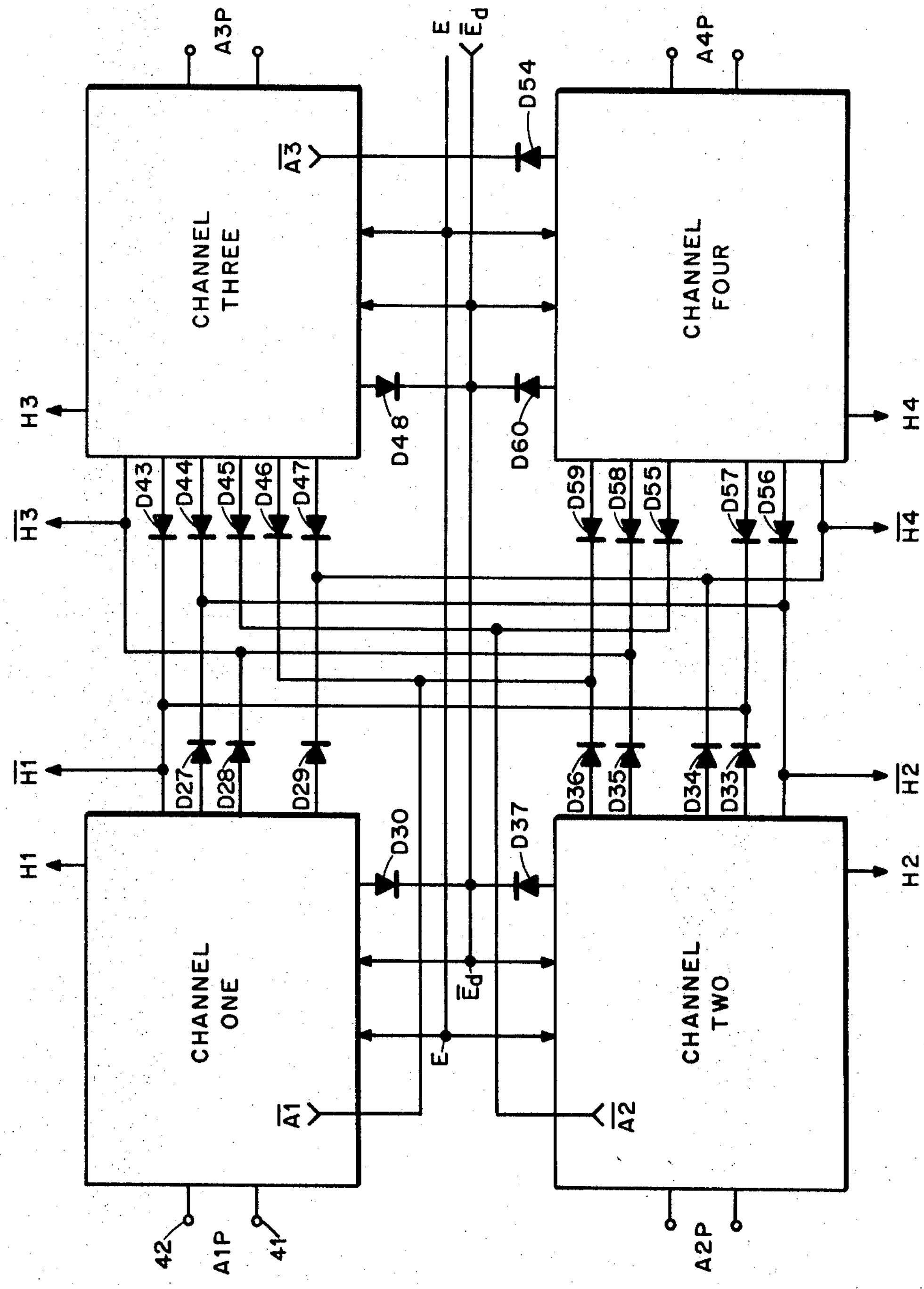
FIG. 6 is a block diagram showing the interlinking of the alarm-detection and logic circuits for four channels, for priority and traffic control.

DESCRIPTION OF FIG. 6 AND ITS RELATIONSHIP TO THE PRIORITY ASSIGNMENT AND ALARM SEQUENCING PROCEDURE

Recall from the description of FIG. 4 that the memory section (flip-flop comprised of transistors Q17 and Q18) is "set" to remember an alarm-signal received in the input section, and in addition to turning on the power transistors Q47 and Q48, this will "set" the head flip-flop Q21—Q22, and potentials H1 and $\overline{H1}$ if, and only if, all of the priority control diodes D27, D28, D29 and D30 are back-biased by the (+12 volt) signals $\overline{H2}$, $\overline{H3}$, $\overline{H4}$ and $\overline{Ed}$. This is due to the fact that conduction of current from the collector of transistor Q18 through any of these diodes whose cathode potential is at ground does not permit the base current to be supplied from signal A1 through resistor R60 to the base of $\overline{H1}$ flip-flop transistor Q21. Recall also that each of the channel two, three and four logic circuits has similarly arranged input, memory, and processing sections. As is shown in FIG. 6, the $\overline{H1}$ line is connected to the cathodes of inhibit diodes D33 in channel two, D43 in channel three and D57 in channel four, so that if the $\overline{H1}$ signal is at or near "ground" (channel one head flip-flop is "set"), these diodes will all be in a conductive condition with respect to subsequent "setting" of the memory section of any one of their respective channel logic circuits, with the result that none of the $\overline{H2}$, $\overline{H3}$ or $\overline{H4}$ signals can be switched from +12 volts toward "ground" until processing of the prior signal in channel one has been completed and the channel one memory and head flip-flops have been "reset" through the end-of-tape procedure described above.

In like manner, the $\overline{H2}$ line of channel two logic is connected to the cathodes of inhibit diodes D27 (channel one), D44 (channel three) and D56 (channel four) so that if the first of several alarm signals in different categories was received at channel two input A2P that signal would be completely processed before the signal in any other channel, "remembered" by the "setting" of its memory section flip-flop, could be processed. Similarly, the $\overline{H3}$ line of channel three logic is connected to the cathodes of inhibit diodes D28 (channel one), D35 (channel two) and D58 (channel four); and $\overline{H4}$ line of channel four logic is connected to the cathodes of inhibit diodes D34 (channel two), D29 (channel one) and D47 (channel four). A "ground" potential at any one of the inhibit diode cathodes in the priority selection network will not permit the head flip-flop to which the anode of that diode is connected to be "set" even though the memory in the channel of that head flip-flop may be "set" to remember an alarm signal received in that channel. The alarm signal will simply be remembered for later processing. The action just described prevents the simultaneous selection of two or more tape heads if two or more alarms in different categories arrive sufficiently close together in time that one is received while another one is being processed. In the illustrated system, three additional alarms could occur during the processing of a signal in one of the channels, without affecting the operation of that channel. The $\overline{Ed}$ signal is used to control the orderly transfer from a channel in which a signal has been processed to another channel in which the memory has been "set" by an alarm signal which is waiting to be processed. It will be remembered that the $\overline{Ed}$ signal goes from +12 volts toward ground when the end-of-tape signal is detected by the time decoder 10, in the integrating circuit of transistor Q10; and the E signal simultaneously goes from ground to +12 volts, and this action causes both the memory and the head flip-flops in the channel in which a message has been processed to be "reset." Referring again to FIG. 4, which references the channel one logic circuitry, assume, for example, that the memory section has just been "set" in response to an incoming alarm signal at A1P, but that some other channel, for example channel three, has previously received an alarm signal for which the relevant message was being processed when the channel one alarm signal arrived. Thus, the signal $\overline{H3}$ applied to diode D28 would be at ground and the current which would normally attempt to set the channel one head flip-flop, supplied from the collector of transistor Q18 (the signal A1), through resistor R60, would be drained off through diode D28 rather than being supplied as base current through diodes D24, D25, and D26 to the base of transistor Q21. When, in response to the end-of-tape signal, the E signal occurs (going from ground to +12 volts) and the $\overline{Ed}$ signal occurs (going from +12 volts to ground) it will be remembered that the first action that occurs is the resetting of the memory section. Although signals E and $\overline{Ed}$ are fed in parallel to all four channels, as is shown in FIG. 6, the channel three memory flip-flop alone will be reset. The channel one memory will not reset because transistor Q19 will not be permitted to turn on, owing to the fact that its emitter is held at base potential which is positive when signal E is applied to its base. This follows because in the processing section of channel one the head flip-flop has not yet been turned on (transistor Q20, 21 and 22 are still "off"), and therefore the collector of transistor Q21 (the $\overline{H1}$ signal) is still at +12 volts. The emitter of Q19 is, therefore, at +12 volts when the E signal is applied to its base, so that transistor Q19 will not be turned on and, therefore, will not change the state of the channel 1 memory. In the meantime, the memory in channel three is reset by the E signal, and the head flip-flop in channel three is allowed to reset, since signal A3 in channel three, (corresponding to signal A1 in channel one,) no longer holds transistor Q20 on an $\overline{Ed}$ being at ground will also no longer hold transistor Q20 on. As soon as channel three head flip-flop resets, the potential at the cathode of D28 will rise from ground to +12 volts, back-biasing this diode. However, diode D30 whose cathode is connected to the signal $\overline{Ed}$ is at that moment still being held at ground by the $\overline{Ed}$ signal, which (see FIG. 7) lasts longer than the E signal. The resetting of the channel three head flip-flop causes the channel three head switch (HN–3) to disconnect the channel three head H–3 from the amplifier 6, and the 5kHz. end-of-tape tone which was coming from the tape 4, is no longer applied to the input of the amplifier; indeed, no head is connected to the input of the amplifier, and at this moment there is no input signal to the amplifier. The disappearance of the 5kHz. signal turns off the tone detector 7 thereby turning off transistor Q6, (see FIG. 5) which in turn causes transistors Q7, Q8, Q9 and Q50 to be turned on. This action reconnects the system to the telephone line (the dialing relay K1 is reenergized through Q9) the pilot lamp PL1 is turned on, and the integrating capacitor C10 begins to discharge through diode D19 and resistor R32 back through the collector of transistor Q50 to ground through its emitter. This discharging action of C10 will cause transistor Q10 to turn off, which in turn will turn off transistor Q11, which in turn turns off transistor Q12; transistor Q13 is then turned off, and transistor Q14 will then be turned off after the time delay provided by discharge of capacitor C11 through the parallel combination of R42 and R43. Turning off transistor Q11 causes the E signal to return from its +12 volts state to ground. The $\overline{Ed}$ signal, after capacitor C11 discharges to the point where transistor Q14 will be turned off, will return from ground to +12 volts. As soon as the $\overline{Ed}$ signal returns to +12 volts diode D30 in channel one (FIG. 4) will be back-biased, and now current will be supplied to the base of Q21 via the diode string D24, D25, D26 and resistor R60 from the collector of transistor Q18. This, of course, will result in the action described above with reference to FIG. 4, and transistors Q20, Q21 and Q22 in the processing section of channel one will become conductive causing the channel one head switch HN–1 to be closed.

The delay which is incorporated in the $\overline{Ed}$ signal, so that it returns from ground to +12 volts after the E signal has returned to ground from +12 volts, is provided in order to assure that the integrating capacitor C10 will have ample time to discharge before processing of a new signal is begun. If the head switch HN–1 is closed too quickly to select the next channel, approximately 5 seconds of the 5kHz. tone may still be present on the tape, reenergizing the tone decoder 7 and causing the capacitor C10 to begin again to charge through resistor R33. If this capacitor has not been permitted to discharge its initial condition, with both sides near ground, the integrator network R33 and C10 will then begin to charge from some potential between ground and +12 volts, and this will result in a shorter time period than the prescribed 10 seconds required to trigger transistor Q10 to the "on" state. This might result in the misprocessing of the alarm signal that is waiting in channel one; for example, it may treat an end-of-message signal 5 seconds long as an end-of-tape signal appearing to be 10 seconds long.

One foregoing discussion explains how alarm signals sequentially received in two different channels will be processed to completion in the order of their receipt. However, it may occur that while an alarm signal in one channel is being processed, alarm signals will be received in two other channels and their memory sections will both be "set" when the end-of-tape signal occurs upon completion of processing of the first signal. A more remote, but possible, situation is that alarm signals are received simultaneously in two or more channels. To assure complete processing of all such signals, in order of their relative importance to the user, the invention provides a priority-allocation system under control of signals $\overline{A1}$ in channel one, $\overline{A2}$ in channel two and $\overline{A3}$ in channel three.

Recalling from the description of FIG. 4 that when the channel one logic memory section is "set" the collector of transistor Q17, which supplies the $\overline{A1}$ signal, goes from +12 volts to "ground," it will be seen that the mere act of "setting" the memory in channel one inhibits the processing of a signal in channels two, three and four, since $\overline{A1}$ is connected to the cathodes of inhibit diodes D36 (channel two), D46 (channel three) and D59 (channel four). Similarly, $\overline{A2}$ is connected to the cathodes of inhibit diodes D45 (channel three) and D55 (channel four), while $\overline{A3}$ is connected only to the cathode of inhibit diode D54 in channel four. Channel one is assigned the highest priority and, therefore, has no diode connected to the $\overline{A}$ signal in the memory section of any other channel. Channel two has the second highest priority, and it has a diode D36 which will prevent its processing section flip-flop from "-setting" if the channel one memory flip-flop has been "set." Channel three is third in order of priority and therefore has two diodes assigned, to examine the state of the memory section of channel one through diode D46 and channel two through diode D45. Channel four which is assigned the lower priority has three diodes D59, D55 and D54, respectively, assigned to examine the states of the memory sections of channels one, two and three.

Thus, if, for example, channel three is in the process of having its alarm message transmitted over the 'phone line 15, and during the processing of the channel three message alarms occur on channels one, two and four, when channel three has completed its processing and the action described above on the E and $\overline{Ed}$ signal lines occur, the following sequence also occurs; when the $\overline{Ed}$ signal rises to +12 volts, the next head flip-flop to "set" will be in channel one since the channel two and channel four head flip-flops will have been disabled from setting via the $\overline{A1}$ signal through diode D36 of channel two and diode D59 of channel four. The alarm remembered in channel one, is therefore, next to be processed, since the head flip-flop in channel one has no other inhibiting signals then applied to it. After the processing of the channel one message, assuming that no other alarm in the category of channel one has occurred, the alarm remembered in channel two will be the next to be processed, since channel four is still being disabled by the $\overline{A2}$ signal applied to diode D55. Upon completion of the channel two message, if the channel one or channel three alarm has not reoccurred the alarm remembered in channel four will finally be processed.

TEST FLIP-FLOP

Transistors Q51 and Q52 in FIG. 5, comprise a test flip-flop, connected between line 5(+12 VS) and nominal ground. Its function is to operate the system for test purposes and at the same time to inhibit the dialing action of relay K1 so that an erroneous alarm message will not be sent. The setting of the test flip-flop is accomplished by the momentary-contact "test" pushbutton 52, which connects the power source +12VB through resistor R48 to the base of Q51, causing both transistors Q51 and Q52 to be turned on, and the flip-flop is then maintained in a "set" state until Q51 and Q52 are turned off. Operating the pushbutton 52 also provides +12 volts to a test-alarm-signal terminal 53, which is connected, for example, to A1P terminal 41, to provide an alarm signal to test the system. When the test flip-flop is "set," the collector of Q52 provides a +12 volt approximately signal to the base of transistor Q9 through resistor R31, forcing transistor Q9 to be maintained in an "on" condition, even if dialing signals are applied to the input of the amplifier 6. The dialing relay K1 is thus not permitted to operate as long as the test flip-flop is in the "set" state. Diode D18 between transistors Q8 and Q9 provides isolation to prevent this dialing inhibit signal from passing to the base of transistor Q50, so that dialing signals can nevertheless be observed in the pilot lamp PL1, which it will be recalled is driven by Q50. This isolation function for transistor Q50 also permits the end-of-tape signal to be recognized by the integrating network at transistor Q10 and, therefore, permits the system to operate during test exactly as it would in normal operation, with only the actual telephone dialing action inhibited. The test flip-flop is reset when the end-of-tape signal occurs and is recognized by the decoder 10; power is removed from line 5, and therefrom from the test flip-flop.

ALARM INPUTS

Figure 8:
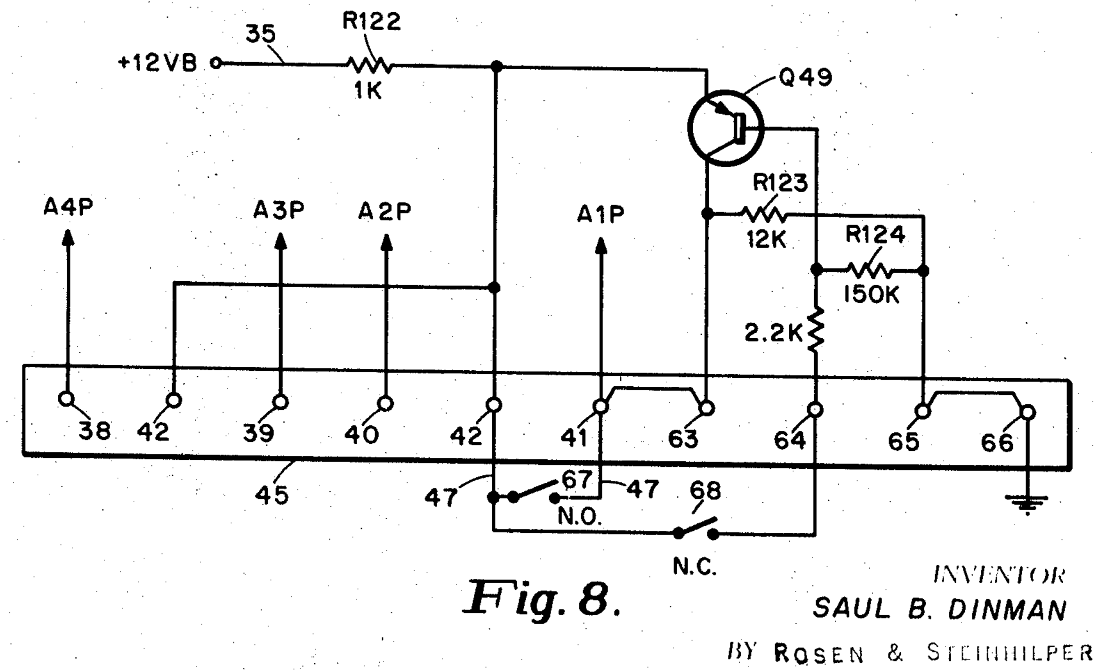
FIG. 8 shows connections for using both normally open and normally closed sensing devices in systems of the invention.

FIG. 8 shows a typical input sensor terminal panel. The main power bus 35 is connected via resistor R122 to several +12VB terminals 42 conveniently located in a terminal panel 45, which are common alarm terminals for all channels. Near each +12VB terminal are located input terminals for each channel; namely, A1P input terminal 41, A2P input terminal 40, A3P input terminal 39 and A4P input terminal 38. As an example, a normally open sensor 67 is shown wired between input terminal A1P and one of the +12VB terminals 41, so that terminals 41 and 42 are used as the A1P input terminals. In practice the sensor 67 will be remotely located and the wires 47, 47 connecting it to channel one input may be several thousand feet long; for example 10,000 feet of 018 AWG two-wire line may be used. Similarly, normally open sensors can be wired between A2P terminal 40 and a +12VB terminal 42 for channel two input, or between A3P terminal 39 and a +12VB terminal for channel three input, or between A4P terminal 38 and a +12VB terminal for channel four input.

To use normally closed sensors, a high-gain (beta=500 or more, typically,) low-leakage silicon transistor Q49 is used, in a low-current sensing circuit drawing, for example, less then 90 microamperes. The base of Q49 is connected via a very large resistor R124, the value of which may be, for example, 150 kilohms, to terminal 65, which, when the normally closed sensing circuit is used, is connected to the system ground terminal 16. The base is connected via a smaller (e.g.: 2,200 ohms) resistor to one terminal 64 for a normally closed sensor switch 68, which is connected between terminal 64 and an alarm common terminal 42. The emitter is connected via the limiting resistor R122 to the +12VB line 35, and to the alarm common terminal 42. The collector is connected via terminal 63 to A1p input terminal 41, and via resistor 123 (typically 12,000 ohms) to ground via terminals 65 and 66.

In the quiescent stage, with sensor switch 68 closed, transistor Q49 has the voltage of bus 35 (+12VB, for example) at its emitter and base, via the switch 68 to the latter; the transistor is turned off, and only the low current drain through it in the off-condition (e.g.: 90$\mu$A) will be drawn from the power supply. When the switch opens, the bus 35 is disconnected from the base, and current drain through Q49 puts a small voltage drop across the emitter-base path. The high gain of the transistor will be sufficient to amplify this drop and turn Q49 on by its own self-bias in resistor R124. When Q49 turns on current flow through the collector-emitter path and terminal 63 is connected to bus 35 the limiting resistor R122. Terminal 63 being connected to A1P input terminal 41, an alarm signal is received in channel one, but terminal 63 can be connected to any desired channel input.

As will by now be appreciated, the tape 4 is the controlling member of the system, once an alarm signal has triggered a logic channel into action; the end-of-tape signal is used to reset the active channel or channels to the inactive state when the alarm signal or signals have been processed and corresponding messages transmitted as programmed. The invention does not require manual resetting of tripped alarm channels. The act of clearing the source of an alarm, at the alarm sensor switch, is sufficient to restore the system to the standby supervisory state. However, there may be circumstances in which it is desirable for the logic of a given channel to latch in the triggered condition, such as in monitoring a very sensitive temperature sensor which may open and close several times if the temperature being supervised remains at a critical level for an extended period of time. In this case, as exemplified in FIG. 4, an optional resistor 54' may be connected across the emitter load resistor 54 of transistor Q15 in the input (trigger and shape) section of the channel one logic circuits. Resistor 54' is about 10 percent of resistor 54, thereby raising transistor Q16 base so near +12VB that removal of the alarm contact between A1P terminals 41, 42 will not cause the input flip-flop to reset. In that case additional alarms that may occur after the first alarm signal in the same channel has been processed will be locked out. The channel will remain locked out until its input flip-flop is reset by turning the system power off and then on again, or by disconnecting the optional resistor 54'. This latching feature may also be used for alternating voltage alarm signals.

FIG. 7 illustrates the sequence of operations of the system involved in switching from channel one to channel two. As a shorthand notion, A1 represents the memory section in channel one; when transistor Q18 is conducting current (memory is "set") A1 is "on" (i.e.: at the potential of the logic bus 36) and when Q18 is not conducting current A1 is "off" (i.e.: at ground). Similarly A2 represents channel two. Likewise H1 represents the output flip-flop (Q21/22) of channel one, and H2 represents the output flip-flop of channel two. Assume that initially, at time ($t$)=0 sec., A1 is being processed, with H1 set, and A2 is set during the processing of A1. At ($t$)=0 sec., the end-of-tape tone (15 seconds) of the channel one message starts. 10 seconds later the E signal starts, and A1 turns off (channel one memory is reset), as shown in line 71. Shortly thereafter H1 turns off, when the $\overline{Ed}$ signal (delayed) appears, as shown in line 72; no head is connected to the input of amplifier 6, and the E signal soon turns off due to lack of a tone from the tape 4. After a delay due to C11, R42 and R43 is FIG. 5, the $\overline{Ed}$ signal turns off, and H2 is then able to turn on, as shown on line 74, connecting the channel two head H-2 to the input of the amplifier. After a slight delay due to the charging of the channel two coupling capacitor corresponding to C22 in channel one, the remainder 75 of the end-of-tape tone is again fed to the amplifier (recall that the end-of-tape tone is located in the same position on the tape for all channels). The channel two memory A2 having been set prior to ($t$)=0, it continues set, as shown in line 73, as is then processed.

For purposes of illustration, the following values of circuit components may be regarded as typical for use in a working embodiment of the system illustrated:

IN FIGURE 4

| | | |
|---|---|---|
| Resistors: | | |
| R54 and R66 (each) | kilohms | 22 |
| R139 | ohms | 22 |
| R122 | kilohm | 1 |
| All others (each) | kilohms | 2. 2 |
| Capacitors: | | |
| C14 | microfarads | 0. 01 |
| C15 | do | 5. 0 |
| C30 | do | 250. 0 |

IN FIGURE 4A

| | | |
|---|---|---|
| Resistors: | | |
| R50 and R51 (each) | kilohms | 1. 0 |
| R126, R127, R128, R129 (each) | ohms | 47 |
| R130, R131 (each) | do | 0. 24 |
| Capacitors: C26, C27, C28, C29 (each) | microfarads | 250 |

IN FIGURE 5

RESISTORS

| | | |
|---|---|---|
| R9=180K | R22=2.2K | R35=2.2K |
| R10=47K | R23=2.2K | R36=5K |
| R11=100K | R24=22K | R37=1.0K |
| R12=500 ohms | R25=22K | R37¹=17K |
| R13=1.5K | R26=12K | R38, 39, 40=2.2K (each) |
| R14=270K | R27=5.6K | R41=1K |
| R15=1.5K | R28=100K | R42, 43=12K (each) |
| R16=2.2K | R29=1.0K | R44, 45, 46, 47, 49 and 53=2.2K (each) |
| R17=22K | R30=1.0K | R48=8.2K |
| R18=3.3K | R31=2.2K | R125=12K |
| R19=8.2K | R32=220 ohms | R131=470 ohms |
| R20=33K | R33=100K | |
| R21=8.2K | R34=47K | |

Capacitors:
- C1, C11, C22=5 $\mu$f. (each)
- C3, C4=250 $\mu$f. (each)
- C2=12 pf.
- C5=0.0047 $\mu$f.
- C6=0.0083 $\mu$f.
- C7=0.015 $\mu$f.
- C8=0.0056 $\mu$f.
- C9=0.47 $\mu$f.
- C10=100 $\mu$f.

The transistors used throughout the system (except Q49) can be low-beta silicon transistors, in which, for example, beta=10, which are available at low cost. Silicon transistors are preferred because of their low leakage current in the "off" state. Practical magnitudes for the circuit components associated with transistor Q49 are shown in FIG. 8.

This completes the description of an exemplary embodiment of the invention.

What I claim is:

1. A transistorized signal processing network comprising a plurality of transistors each having emitter, collector and base electrodes, operating-voltage terminals for said network, means for connecting each of said transistors in said network and for establishing, in the presence of a prescribed operating voltage at said terminals, bias conditions such that the base emitter path thereof is substantially nonconducting in consequence whereof the emitter-collector path thereof is substantially nonconducting, said transistors being interconnected in a sequence such that upon a change in said bias conditions, which switches to a conducting state the emitter-collector path of any transistor in said sequence said any transistor provides a voltage to alter the bias conditions of all succeeding transistors to thereby switch the emitter-collector paths of said succeeding transistors to a conducting state, signal input terminals for said network connected to a first transistor in said sequence for providing said change in bias when said input terminals are substantially effectively electrically connected one to the other, whereby when an input signal which electrically effectively connects one input terminal to the other is presented to said input terminals said transistors become biased so that their respective emitter-collector paths are electrically conducting, and in the absence of said signal said emitter-collector paths are normally and remain all substantially nonconducting and current drain from the source of said operating voltage is minimized.

2. A transistorized signalling system including a network according to claim 1 for identifying and processing an input signal, responsive means for providing a prerecorded message signal in response to the processing of said input signal, and switch means including at least one transistor having a path between its emitter and its base electrodes interposed between one of said operating-voltage terminals and said network and a path between its emitter and collector electrodes interposed between said terminal and said response means for applying operating voltage to said response means and thereby rendering said response means operative only when said network is biased to switch the emitter-collector paths of its said transistors to a conducting state.

3. A system according to claim 2 in which said response means includes: a recorder device for storing a prerecorded message, device reading means, and a motor to drive the recorder device, and first switch transistor means for applying operating voltage to said motor in response to said processing of said input signal; message signal output means, and second switch transistor means for applying operating voltage to same in response to said processing of input signal; and means coupled to said network for connecting said message reading means to said message signal output means for providing in said signal output means a message stored in said recorder device.

4. A system according to claim 3 in which said response means includes means to couple said message signal output means to a telephone line in response to an input signal, and said message includes recorded information for calling a prescribed subscriber's number over said telephone line.

5. A transistorized signalling system including a plurality of ($n$) networks according to claim 1, in which each network is for processing an input signal representative of one of ($n$) unique phenomena, response means for providing and processing an equal plurality of ($n$) unique message signals one for each of said phenomena, said operating-voltage terminals being coupled to all of said networks in parallel, switch means responsive to increased current flow through any one of said networks due to presence of its unique input signal for applying operating voltage to said response means and thereby rendering said response means operative, means associated with each of said networks responsive to such increased current flow therethrough for activating in said response means the unique message signal for the phenomenon represented by the input signal of said network, means responsive to such increased current flow through each one of said networks for inhibiting the subsequent activating by any other of said networks of its respective associated unique message signal while a prior-activated message signal associated with said one of said networks is being processed by said response means, and means associated with said response means responsive to a signal component at the end of each of said message signals for terminating the action of said inhibiting means of the respective network associated with said message signal.

6. A network according to claim 1 comprised of a trigger section having a first plurality of said transistors including a first transistor for generating a trigger signal responsive to said input signal, following said trigger section a memory section having a second plurality of said transistors arranged in a sequence, means coupling said trigger signal to the first transistor in said sequence in said memory section for rendering conductive the emitter-collector paths of the transistors in said memory section and thereby storing a signal potential representative of said input signal for subsequent processing, and following said memory section a process section having a third plurality of said transistors, means to apply said signal potential to the transistors of said process section for rendering conductive the emitter-collector paths of said transistors, and inhibiting means responsive to a condition external to said network for inhibiting said application of said signal potential to the transistors of said process section when said condition exists.

7. A transistorized signalling system including a plurality of ($n$) networks according to claim 6, in which each network is for processing an input signal representative of one of ($n$) unique phenomena, response means for providing and processing an equal plurality of ($n$) unique message signals one for each of said phenomena, said operating-voltage terminals being coupled to all of said networks in parallel, switch means responsive to increased current flow through the memory section of any one of said networks for applying operating voltage to said response means and thereby rendering said response means operative, means associated with the process section of each of said networks responsive to increased current flow therethrough for activating in said response means the unique message signal for the phenomenon represented by the input signal of said network, means responsive to such increased current flow through each one of said networks for inhibiting the subsequent activating by any other of said networks of its respective associated unique message signal, and means for terminating the action of said inhibiting means in response to a signal component at the end of each of said message signals.

8. A signalling system for selectively processing one of a plurality of signals representative of ($n$) different events comprising: a plurality of ($n$) signal handling networks each being reserved for and having an input for an input signal representing a unique one of said events, a memory for storing said input signal, and a processor for processing said signal; a first priority control network interconnecting the memories of said signal networks for establishing an order of priority processing of two or more simultaneously stored signals; a second priority control network interconnecting the processors for inhibiting ($n$−1) processors when the remaining processor is processing a signal; message storage means for storing a plurality of ($n$) unique messages each corresponding to a unique one of said events; message transmitter means; and means interconnecting said processors and said message storage means for applying to said message transmitter means the message corresponding to the signal stored in any of said networks having a processor which is not inhibited.

9. A system according to claim 8 including switch means for controlling energizing power for said message storage means, and means, responsive to a signal in the memory of any of said signal handling networks, for operating said switch means to apply power to energize said message storage means.

10. A system according to claim 8 in which said message storage means is tape recorder means having a plurality of ($n$) tracks one for each of said messages, and a plurality of ($n$) tape-reading heads each of which is located to be able to read the message stored on a unique one of said tracks; and comprising a separate head switch for connecting each tape-reading head to said message transmitter means; and means connecting each head switch to the processor of the signal-handling network which is reserved for the event corresponding to the message which the head controlled by the head switch can read; the connection being such that each head switch is closed when its processor is processing a signal and opened when its processor is inhibited.

11. A system according to claim 10 in which each head switch is a switch network for an alternating electric signal comprising first and second terminals for receiving a unidirectional control voltage, in parallel between said terminals a first patch comprised of first and second diodes having a first junction between the cathode of one and the anode of the other, and a second path comprised of third and fourth diodes having a second junction between the cathode of one and the anode of the other, the diodes in both paths being poled in the same sense between said terminals, so that when a control voltage which forward biases said diodes is applied to said terminals they are all rendered conductive, and said diodes being selected so that when they are conductive, the magnitude of current which passes in each of said paths can be made to be larger than the magnitude of current of said signal flowing between said first and second junctions when signal potential is applied to one of said junctions.

12. A system according to claim 10 in which said tape recorder means includes a cartridge having an endless loop of tape and a platform supporting a motor-driven capstan, said cartridge including a pinch roller located on one side of said tape such that when said cartridge is on said platform adjacent said capstan said pinch roller holds said tape against said capstan, for positive drive of said tape.

13. A system according to claim 8 including means to connect said message transmitting means to telephone lines, in which said message storage means has a line-seizure signal preceding each of said messages.